United States Patent [19]
Roberts

[11] Patent Number: 5,999,258
[45] Date of Patent: Dec. 7, 1999

[54] OPTICAL INTERFERENCE MEASUREMENT METHOD AND SYSTEM

[75] Inventor: Kim Byron Roberts, Welwyn Garden City, United Kingdom

[73] Assignee: Nortel Networks Corporation, Montreal, Canada

[21] Appl. No.: 08/882,450

[22] Filed: Jun. 26, 1997

[51] Int. Cl.[6] .................................................. G01B 9/02
[52] U.S. Cl. ........................................ 356/345; 356/352
[58] Field of Search ................................. 356/352, 345; 359/123, 341

[56] References Cited

U.S. PATENT DOCUMENTS

| | | | |
|---|---|---|---|
| 5,216,532 | 6/1993 | Taylor | 359/123 |
| 5,373,385 | 12/1994 | Darcie et al. | 359/162 |
| 5,680,246 | 10/1997 | Takahashi et al. | 359/341 |

FOREIGN PATENT DOCUMENTS

| | | |
|---|---|---|
| 0634843A2 | 6/1994 | European Pat. Off. . |
| 96-31288 | of 0000 | Japan . |
| WO94/01942A1 | 1/1994 | WIPO . |
| WO96/05665 | 2/1996 | WIPO . |

*Primary Examiner*—Frank G. Font
*Assistant Examiner*—Tu T. Nguyen
*Attorney, Agent, or Firm*—John D. Crane

[57] ABSTRACT

In an optical transmission system, multi-path interference is distinguished from the desired signal and other interferences, by measuring light transmitted from a source, using an element of the transmission system. Frequency modulation products are used, and the signature of the interference in the frequency spectrum is derived.

23 Claims, 9 Drawing Sheets

OPTICAL INTERFERENCE MEASUREMENT METHOD AND SYSTEM

FIELD OF THE INVENTION

The present invention relates to methods of operating an optical transmission system, methods of operating an element in an optical transmission system, and systems for determining interference in an optical path.

BACKGROUND TO THE INVENTION

Multipath interference (MPI) in an optical link occurs when an optical signal can take more than one path to reach the same place. This can occur as a result of branching and recombining topologies, or as a result of reflective elements present in the link causing cavity effects. Such effects may occur as follows:

After one partial reflection in a link, a delayed version of the original signal is created, travelling in the opposite direction to the original signal. If the reflected signal is again partially reflected, a delayed version of the original signal is created which travels in the same direction as the original. It may cause interference with the original signal which can be constructive or destructive, according to the relative phase. The relative phase will depend the frequency of the signal and on the delay, which is in turn dependent on the difference in path lengths, i.e. the distance D between the reflective features.

The magnitude of the interfering signal will depend on the degree of reflection at each feature, on the gain or loss between reflections, the optical distance D, and the signal frequency. For a branching topology, path length difference, signal frequency, and path gains will characterise the MPI.

Reflections may be caused by connections, taps, optical amplifiers or isolators for example. Small amounts of reflection can cause significant interference particularly in systems containing optical amplifiers, which have gain between the reflections. This means the unwanted reflections will be amplified twice for each round-trip. Isolators are used to limit the round-trip gain, operating with a high loss in a reverse direction. However, the loss will be in the same order as the gain of the amplifier, thus the effect is only mitigated but not eliminated. MPI may vary with time as components degrade or are replaced, or as paths are switched.

Current methods for measuring MPI or parameters relating to MPI can be divided into three categories. Firstly, laboratory instruments for determining MPI effects of individual components or units will insert precise sinusoid test waveforms and include high frequency spectrum analysers for determining resultant outputs. They are not suitable for incorporation into transmission systems or for testing. They are expensive, unsuitable for field use, and incapable of operating with existing transmission sources which cannot generate pure waveforms, or be easily provided with branches to receive pure waveforms.

Secondly, methods for assessing bit error rates (BER) or signal to noise ratios (SNR) of optical transmission systems are known. They may assess the output eye, and in some circumstances, MPI may cause up to around half the noise or errors that are detected.

However, it is impossible to separate MPI from optical noise in such systems. Thus although they can perform tests under realistic operating conditions, with data traffic present, they cannot be used to derive amounts of MPI or locate sources of MPI.

Thirdly, methods of locating the cause of optical reflections are known. One example is an optical time domain reflectometer (OTDR). It is a dedicated instrument for locating reflections. It is bulky, costly, and cannot work through optical amplifiers, or while there is traffic present at the same wavelength.

Another example is known from PCT/GB95/01918 in which the function of an OTDR is incorporated in an optical element, by using the data signal as a stimulus for locating causes of reflections. The delay can be measured and thus the distance to reflective features can be calculated. This can help to locate reflective features, which is of great assistance in fault finding during commissioning.

However, such techniques can only measure reflections from points downstream of the measurement point. Furthermore, the MPI which might arise downstream of reflective features depends further on the amount of any second reflection of the reflected signal, and on any gain encountered by the twice reflected signal. These cannot be measured, and so the amount of MPI remains unknown. Furthermore, OTDR techniques cannot achieve good resolution at large distances, thus it may be difficult to distinguish closely neighbouring reflection sources.

Furthermore, if there are isolators in the path, as are usually provided in optical amplifier units, then measurements of reflections may be completely unrepresentative of MPI.

Accordingly, existing methods give no suggestion as to how to determine an amount of MPI in a link when data traffic is present. They give no suggestion as to how to determine characteristics of MPI from a measurement point downstream of sources of MPI, and no suggestion of how to derive a signature of MPI from an optical signal, or how to assess the characteristics causing the MPI.

SUMMARY OF THE INVENTION

The invention aims to address these shortcomings.

According to one aspect of the invention, there is provided a method of operating an optical transmission system, comprising the steps of:

transmitting light from an optical source;

measuring the light transmitted in a downstream direction at a location downstream of the source using an element of the transmission system;

deriving the amount of multi-path interference by analysing the measured light, to distinguish interference caused by multi-path effects from the remainder of the measured light.

By measuring transmitted light rather than reflected light, the actual interference can be determined more accurately. Separating multi-path interference from other interference facilitates deciding what sort of remedial action to take either during commissioning or during revenue generating use. By measuring light as part of system operation, rather than testing components in a laboratory, more realistic results are obtained, for example, the effects of bad connections such as bad splices are taken into account. By measuring light using an element of the system, influences of test equipment on the system can be reduced, hardware costs can be reduced, and results obtained rapidly.

According to the invention there is provided a method of operating an optical transmission system, comprising the step of transmitting light from an optical source; and measuring at a downstream location, the transmitted light travelling in the downstream direction, analysing the remotely measured light, to derive an amount of degradation present in an optical path between the source and the remote measurement location, while the data traffic is present.

Making measurements while data traffic is present is not feasible with existing laboratory instrument based methods, but brings advantages in terms of reduced down time and improved realism of test conditions.

According to another aspect of the invention, there is provided a method of operating an element in an optical transmission system, comprising the steps of:

measuring the light transmitted in the system;

deriving an amount of interference by analysing the measured light to distinguish interference caused by multipath effects from the remainder of the measured light; and using the derived value to control an element in the transmission system.

Using the derived value to control an element of the system enables automatic issuing of alarms, if the element is an alarm issuing means, or automatic remedial measures such as reduction in optical gain of an amplifier, and a compensating gain increase away from the MPI source, for example. In an extreme case, rerouting of traffic could be triggered, to avoid the MPI source.

According to another aspect of the invention, there is provided a method of operating an optical transmission system comprising the steps of:

transmitting light from an optical source, the transmitted light being frequency modulated;

measuring the transmitted, modulated light, deriving the amount of multipath interference by analysing the modulation in the transmitted light.

Using the frequency modulation to derive the multipath interference enables good results to be obtained because the MPI will leave a signature in the frequency spectrum in a narrow and low frequency range which is measurable without expensive signal analysis equipment, and with little disruption by any amplitude modulation.

According to another aspect of the invention, there is provided a system for determining interference in an optical path of an optical transmission system comprising:

means for measuring light in the optical path; and means for deriving an amount of interference caused by multi-path effects, from the light measured by the measuring means, wherein the measuring means is incorporated in an element of the transmission system.

According to a preferred embodiment, the analysis of frequency modulation products comprises analysis of the frequency spectrum pattern by comparison with predetermined spectrum patterns. This enables the signature of the multi-path interference in the frequency spectrum to be extracted quickly and easily with a minimum of calculation.

Preferably the analysis of the frequency modulation products comprises analysis of the slope of the frequency spectrum by comparison with predetermined frequency spectrum slopes. This method enables me accurate extraction of the signature of the multi-path interference, particularly where the differential delay, D of the interference is in the same order as the coherence time of the optical source laser.

Preferably the analysis of frequency modulation products comprises analysis of variance in the frequency modulation products, by comparison with predetermined variants amounts. This enables easy and accurate extraction of the signature of the multi-path interference particularly when the differential delay is large relative to the coherence time, or line width, of the laser.

Preferably, the deriving step comprises the step of comparing a signal representing the measured light, with templates generated for various possible multi-path delays, and the step of deriving actual multi-path delays, and amounts of interference, from the comparison results. This enables the amount of calculation to be minimised, and deriving the actual multi-path delays can assist in identifying the source of the multi-path interference, which may facilitate deciding what actions are appropriate.

Preferably, the method further comprises the step of transmitting light with an applied frequency modulation in a frequency band below that of a data traffic transmission rate. This enables any disturbances in the measurements by the data traffic to be reduced, and enables any disturbance to the data traffic by the applied frequency modulation to be minimised. The measurements of the multi-path interference signature can be more accurate if the amount of frequency modulation applied is known.

Preferably, the derived value is used to control an element in the transmission system such as an optical amplifier, of an alarm issuing means. This enables automatic alerting of any problem to a centralised control facility. Alternatively, automatic remedial measures, such as reduction in optical gain of an amplifier near the source of the multi-path interference, can be initiated.

In a preferred embodiment, the further step of measuring the distance along the optical path to reflective features causing the multi-path interference, is carried out. Together with the derived knowledge of other parameters of the interference, such as the amount of interference and the delay value for the multi-path interference, the source of the multi-path interference becomes easier to locate, and appropriate counter measures can be taken.

Preferably the system for determining interference in an optical path comprises means for applying a frequency modulation to the light in the optical path and means for deriving the amount of interference using the frequency modulation in the transmitted light. Preferably, an optical transmission system is provided, comprising at least one element, and comprising an interference determining system according to the invention, wherein one of the elements is controlled in dependence on the determined amount of interference. Preferably, the interference determining system comprises means for measuring the light in the optical path at a second location in the optical path, and the means for deriving an amount of interference is operable on the basis of measurement of light at two or more locations in the optical path.

In principal, any of the preferred features can be combined in any manner and incorporated in one of the methods, or in a corresponding system according to the invention.

For a better understanding of the invention, and how the same may be carried into effect, it will now be described by way of example with reference to the accompanying drawings, in which.

DETAILED DESCRIPTION

Figure 1:
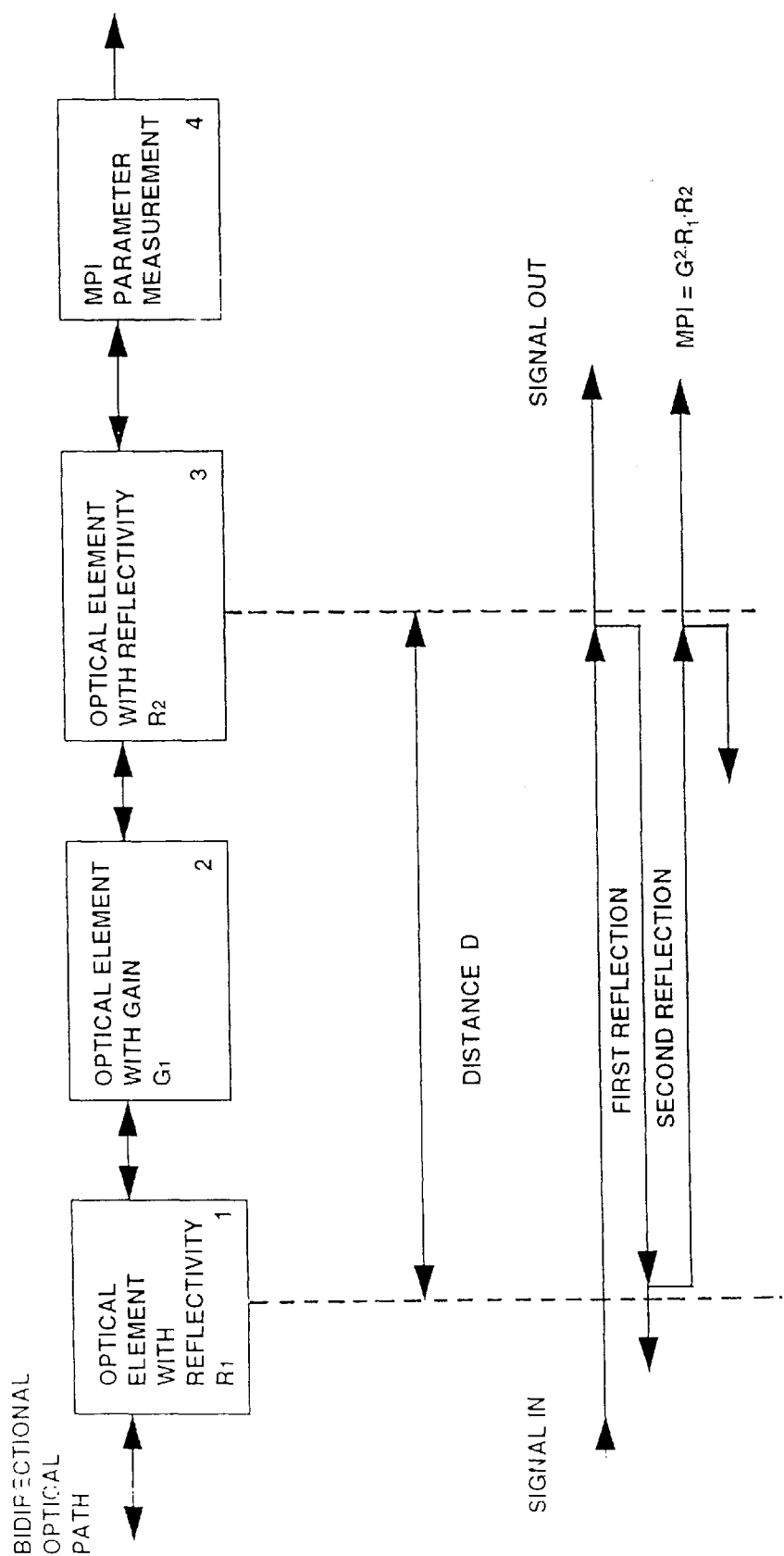
FIG. 1 shows in schematic form an optical transmission system including portions of an interference determining system according to the invention.

FIG. 1 shows an optical transmission system with an optical element 1 having reflectivity $R_1$, an optical element with gain G1, and a second optical element with reflectivity R2. These three elements form a cavity. Downstream in the optical path there is an MPI parameter measurement means 4. The first reflection and second reflection from the reflective elements in the optical path are shown in schematic form. The resulting signals reaching the MPI parameter measurement means 4 include the desired signal, and an interference element caused by the two reflections. Further reflections will occur, but in practice their effect is negligible.

Figure 4:
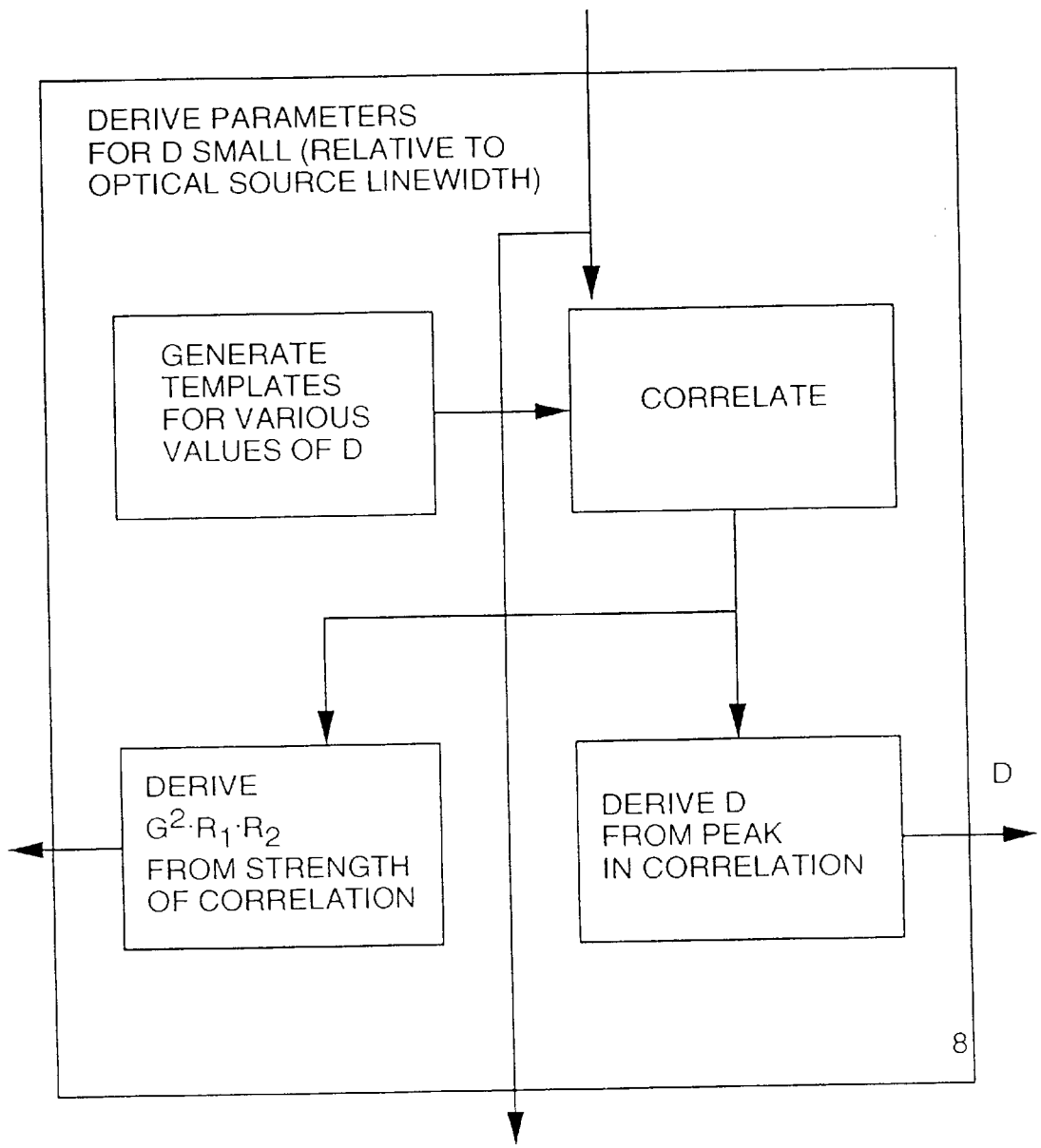
FIG. 4 shows in schematic form the function of deriving parameters for a small D, as shown in FIG. 3.

The system for determining interference in the optical path, of the present invention, may include just the MPI parameter measurement means of FIG. 4, which may be partly incorporated in an element such as an optical amplifier in the transmission system. The interference determining system may also include the optical source, which is usually a laser, used for transmitting data traffic along the optical path.

Figure 2:
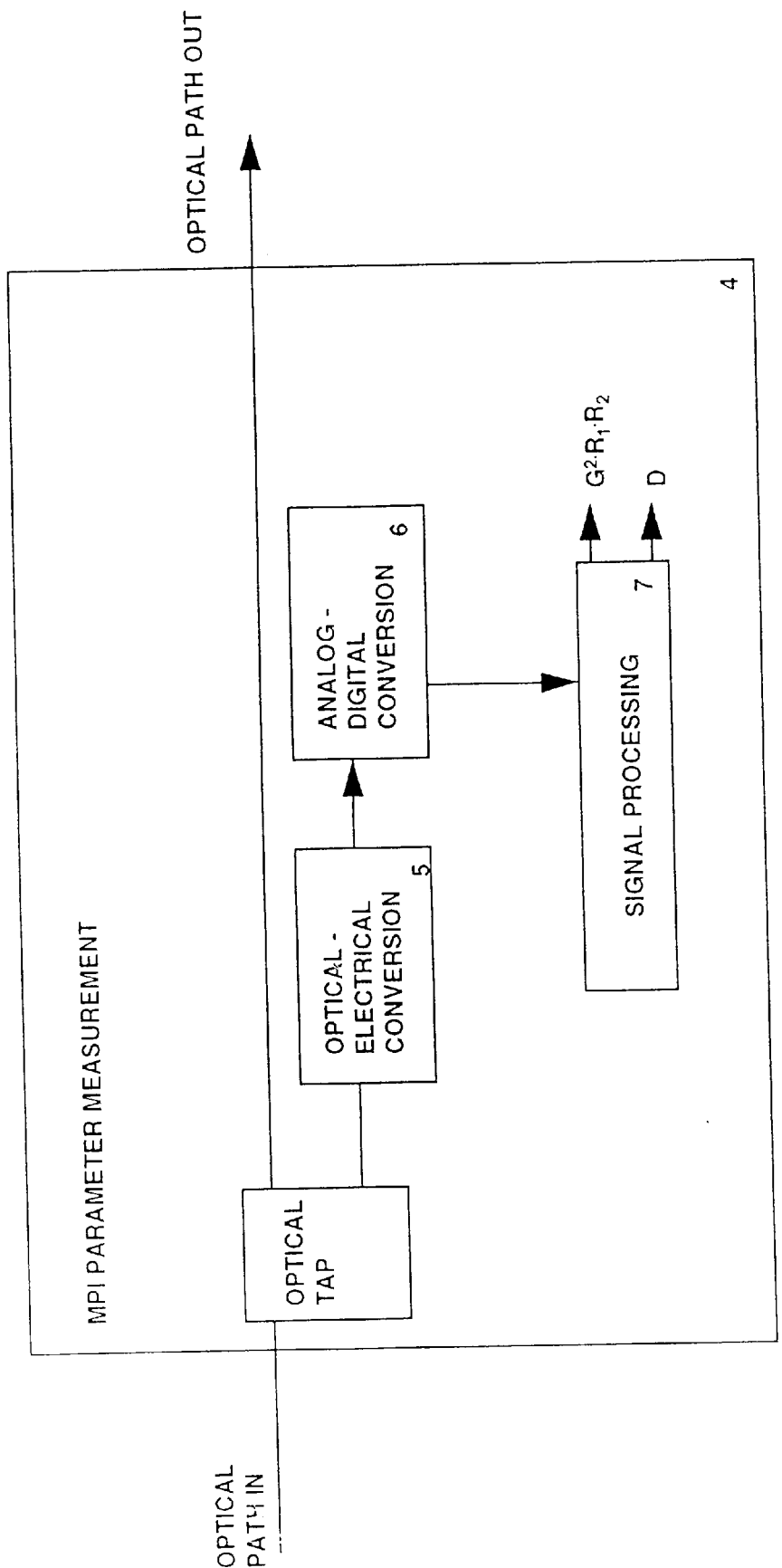
FIG. 2 shows the interference parameter measurement means of FIG. 1 in more detail, again in schematic form.

FIG. 2 shows in schematic form the MPI parameter measurement function, which may be incorporated in an optical amplifier or other element. An optical tap is provided, which taps off a small portion of the signal. An optical to electrical conversion stage 5 and analogued digital conversion stage 6 are provided to prepare a signal suitable for the signal processing stage 7.

Figure 3:
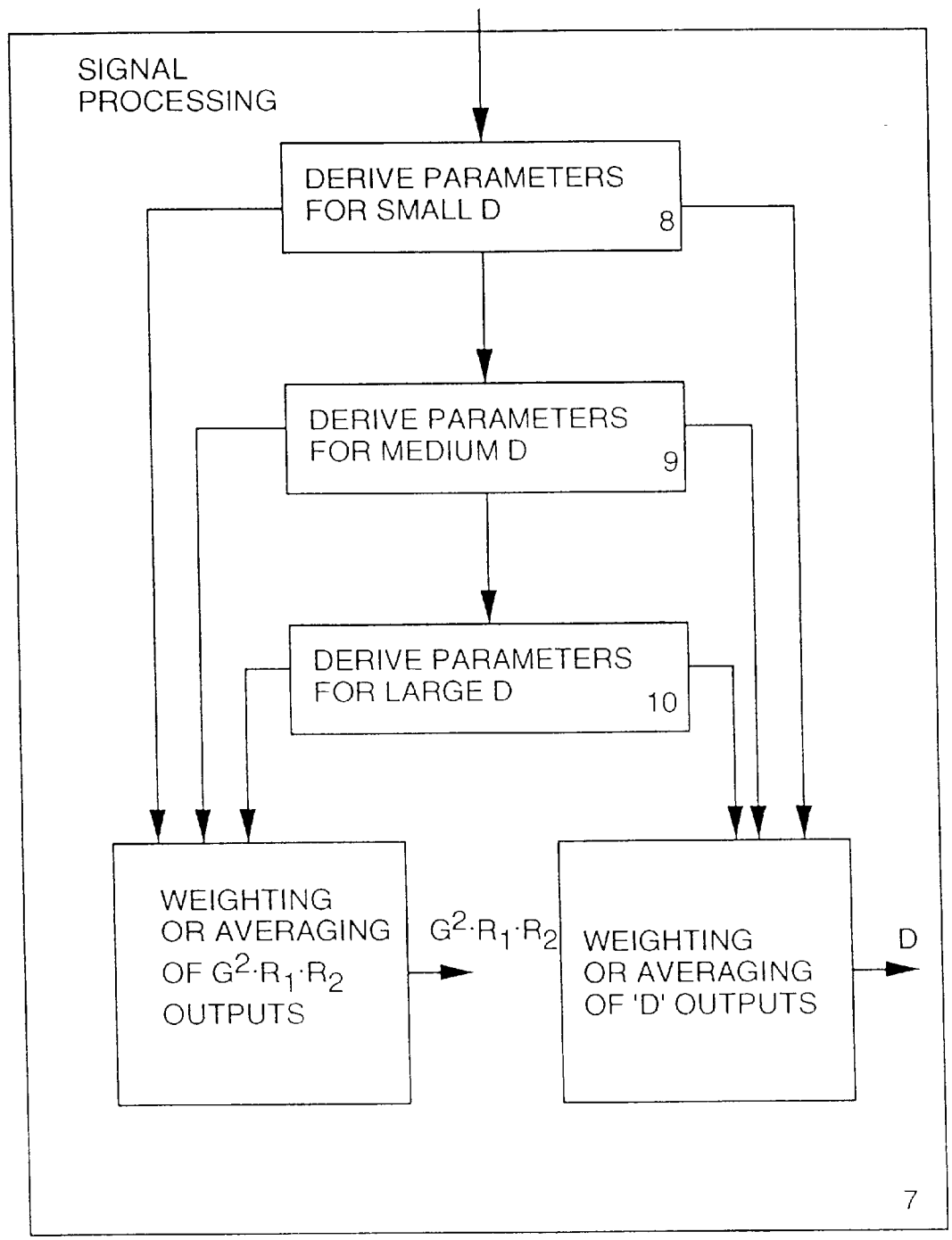
FIG. 3 shows the signal processing function of FIG. 2 in more detail, again in schematic form.

This signal processing stage is shown in more detail in schematic form in FIG. 3.

The operation of a system according to an embodiment of the invention will now be described.

A known frequency modulation of the optical data stream is created at a relatively low frequency. For example, the dither signals used for wavelength identification and noise measurement as shown in PCT/GB95/01918 are in the region of 30 kHz and create amplitude modulation and about 750 MHz (0.006 nm) of frequency modulation on the continuous wave laser in a system operating at OC-192 (a data rate of 10 Gb/s). The resulting frequency modulation will be at least partly in quadrature with the amplitude modulation created by the dither.

As shown in FIG. 1, that optical signal passes through an optical link. This optical link may contain optical amplifiers. There may be two or more reflections along the optical link that create multipath interference. Downstream of at least the first reflection, an MPI measurement stage is provided, as is shown in more detail in FIG. 2. Within an optical amplifier, or other optical equipment, a portion of the optical signal, perhaps 5%, is tapped off. That signal is detected at a PIN diode amplified by a transimpedance amplifier and sampled by an A/D converter, at for example 10 MHz. This monitor circuit has a much lower bandwidth than the 10 Gb/s data that is being transmitted down the optical link.

The sampled data is then analysed, as described below, in a microprocessor and the strength and/or differential delay of the MPI is calculated. To extract the MPI signature in the frequency spectrum, and derive the strength and/or differential delay D, various techniques are possible. Three methods will be described in more detail, each appropriate for a range of values of D. A preferred implementation uses all three methods, in sequence, to the data in FIG. 3 and then reports the strongest result, or a weighted average, as shown in FIG. 3.

These values may be displayed locally, or remoted by the fiber transmission system. The values may be compared to thresholds and alarms generated when outside the thresholds. The values may be used in conjunction with reflection measurement results (PCT/GB95/01918) to assist in locating and correcting source of the reflections.

Analysis Methods

For this analysis the MPI source is represented as a cavity comprising two reflections $R_1$, $R_2$ separated by a round-trip delay D, and a loss or gain G between them. For other cases, such as branching topologies, the product of the reflections, $G^2 \cdot R_1 \cdot R_2$ can be appropriate modified. The product $G^2 \cdot R_1 \cdot R_2$ will be referred to as R.

Three general cases exist as a function of the differential delay of the multiple paths in relation to the coherence time, or line-width of the source laser. (See the attached appendix for a more detailed derivation).

Method 1

The method summarised in FIG. 4, is suitable if the differential delay, D, is very small relative to the line-width of the laser. For example, the cavity could have a length of 10 cm and the linewidth of the laser may be 5 MHz.

With the product of the two E-field reflections being R, the sampled signal can be approximated by $A*R*\cos(\text{dither}(t)-\text{dither}(t-D)-\omega*D)$ This signal is the baseband version of frequency modulation by the difference between optical phase dither signal the desired and the reflected version of the dither signal delayed by D. If the dither(t) is sinusoidal then the sidebands of the spectrum can be calculated by Bessel functions. Classic FM analysis can be applied if other dither patterns are used.

The constant A is specific to the gains present in a specific implementation. $\omega$ is the optical angular frequency. The units of the dither are radians of optical phase.

By detecting the strengths and pattern of the FM products, the values of R and D can be calculated. These FM products will have different phase and frequency characteristics than the original dither and so can be distinguished from the AM dither.

Figure 7:
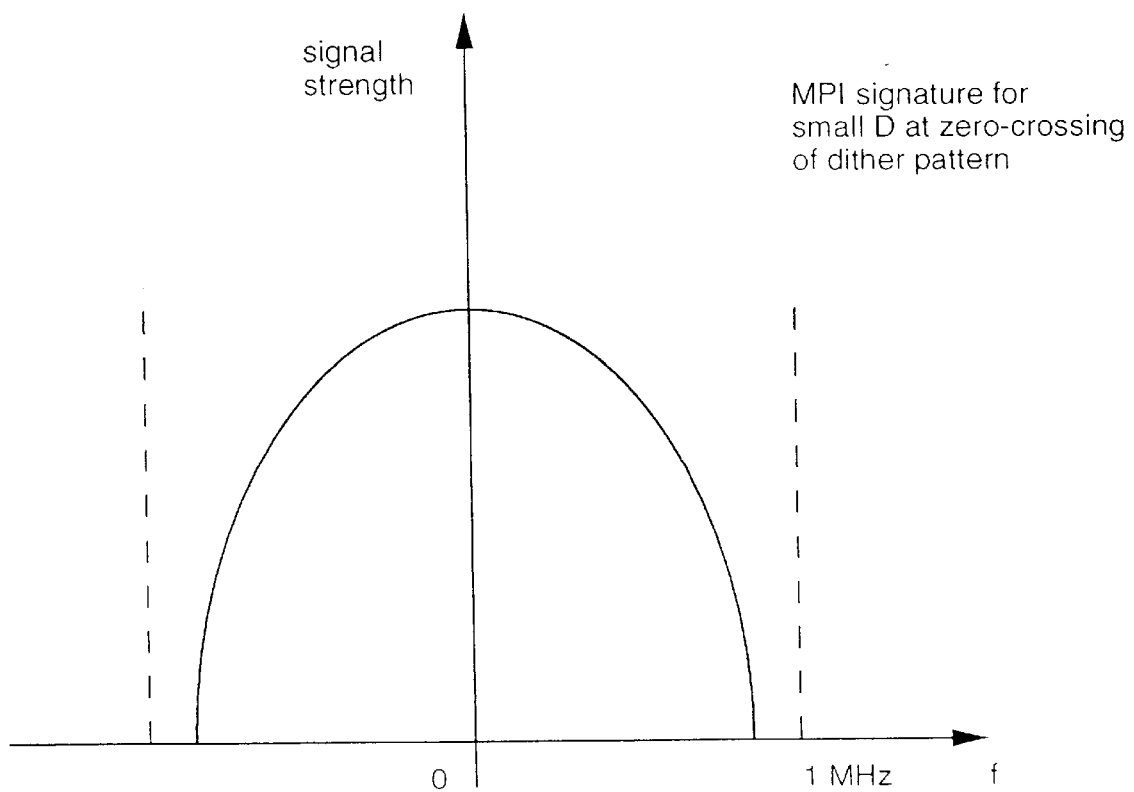
FIG. 7 shows a frequency spectrum for a typical multi-path interference signature for a small D, near the zero crossing of the dither pattern.

The shape of the spectrum as shown in FIG. 7 within a monitoring window depends on the laser line width and on D. Thus D can be extracted, for example by correlation with various templates created previously with knowledge of laser linewidth. Peaks of correlation indicate D. Obviously there may be multiple peaks if there is more than one cavity upstream causing MPI.

Figure 8:
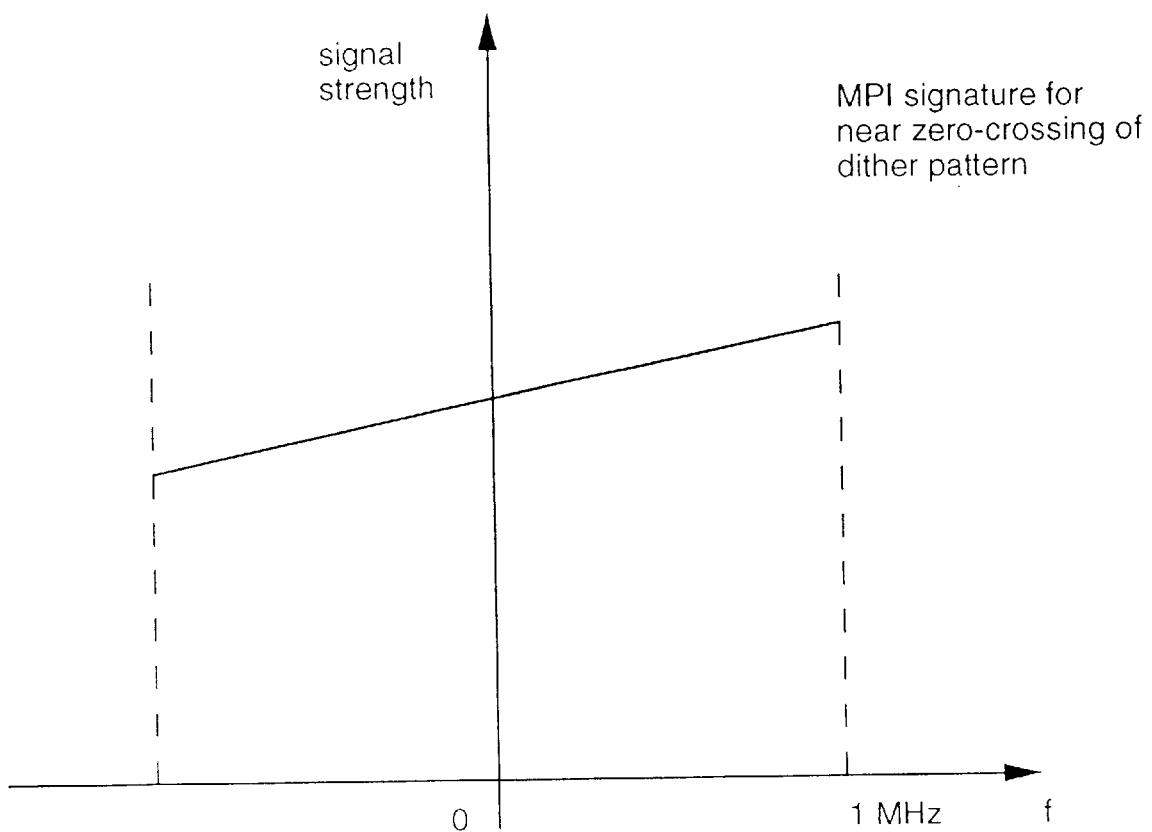
FIG. 8 shows a similar graph to that of FIG. 7, but for the case where D is of medium value.
Figure 9:
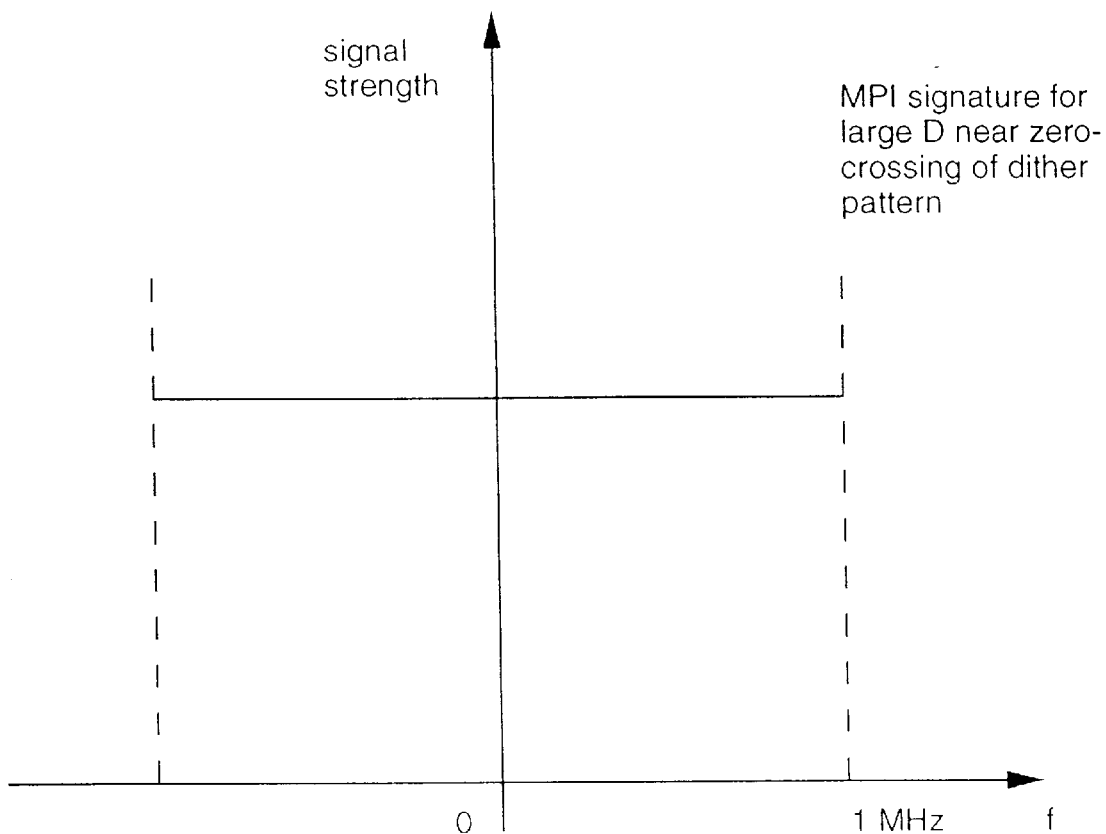
FIG. 9 shows a typical signature using the same form of graph as FIG. 7, but for the case where D is large.

The window is limited in bandwidth by the PIN detector, the amplifier, and the AID, and by whatever processing means is provided, eg a DSP, for correlation with the stored templates. With existing technology the window may be around 1 MHz, as shown in FIGS. 7 to 9.

The strength of correlation is dependent on the amount of MPI, and so R can be derived if A is known for a particular implementation. More details of an example of the derivation are set out in an Appendix.

Method 2

Figure 5:
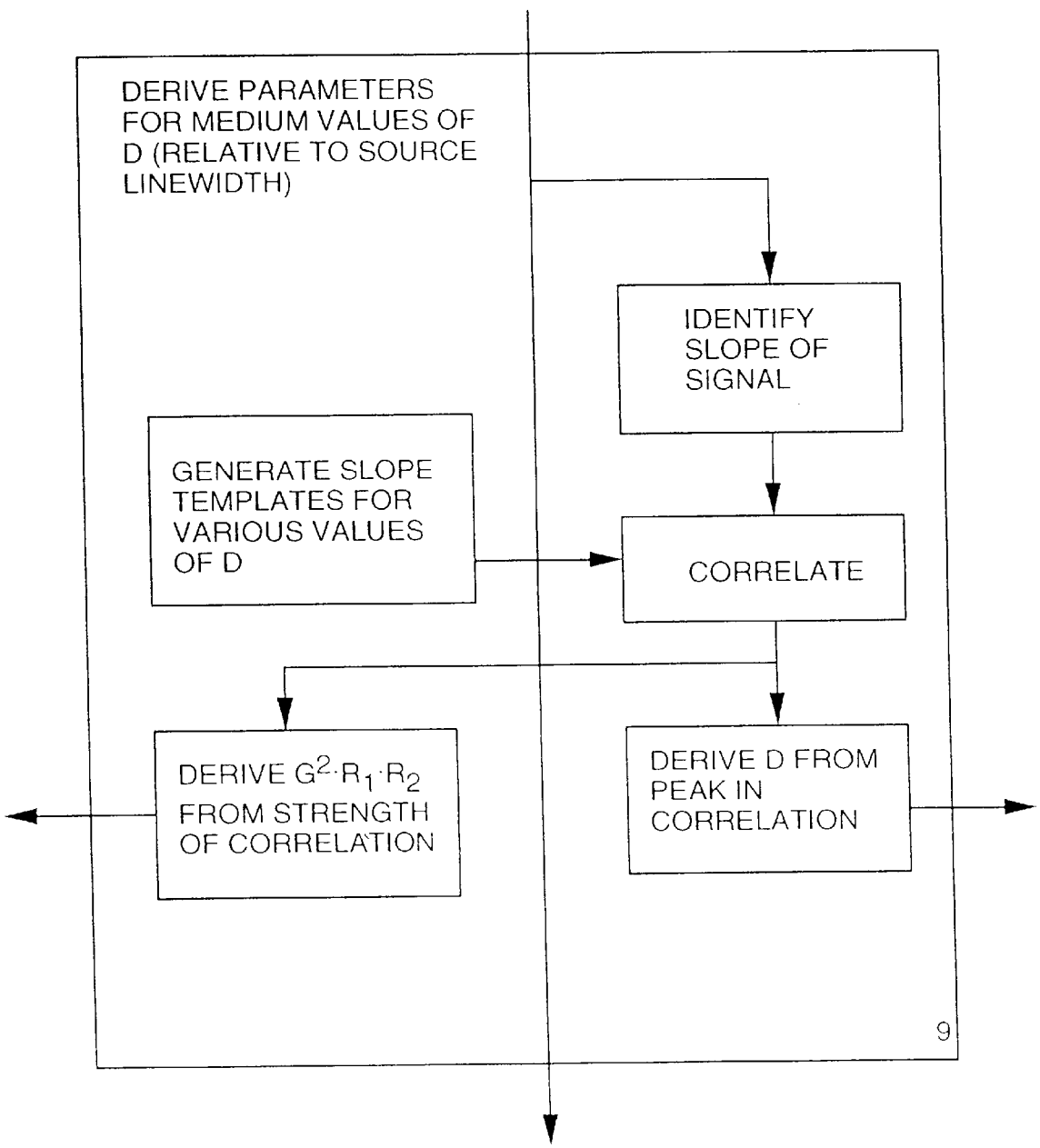
FIG. 5 shows the function of deriving parameters for a medium D as shown in FIG. 3, in schematic form.

If the value of D is in the same order as the coherence time of the laser, the FM products spectrum may be spread too wide for any shape to be detectable. In this case, the slope of the spectrum within the window would change as the wide shape sweeps past the window. These changes in slope could be monitored to identify the rate of change of slope for example. This gives an indication of the shape which can be compared to templates created for various values of D as with method 1. FIG. 5 shows this method in schematic form, and FIG. 8 shown in graphical form the slope of the spectrum at a point near the zero crossing, as the noise shape sweeps through the window. As before, D can be calculated from which template gives best correlation, and improved accuracy can be obtained by interpolation. As with method 1, the amount of MPI can be derived from the strength of the correlation peaks.

Method 3

Figure 6:
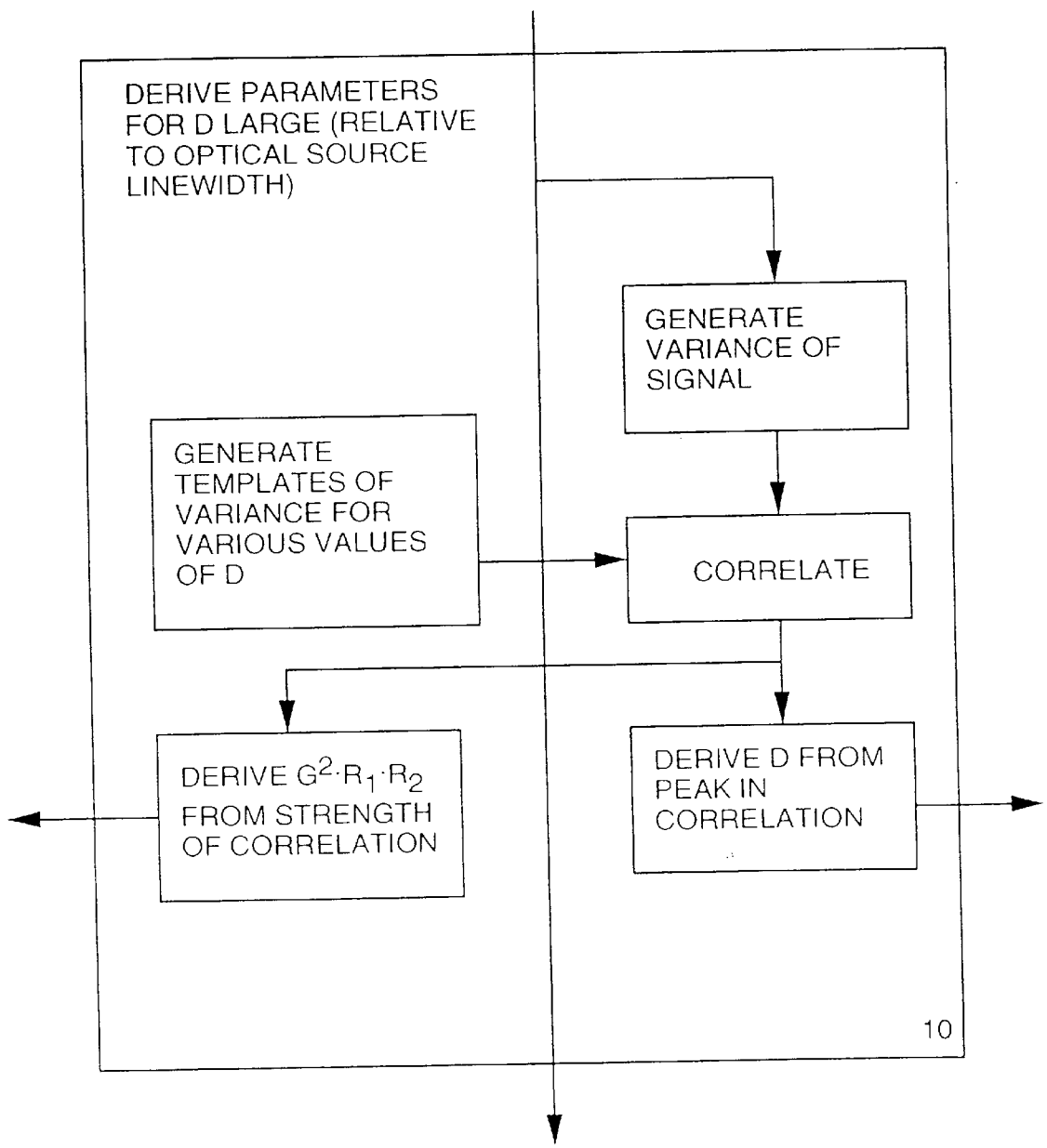
FIG. 6 shows the function of deriving parameters for a large D, as shown in FIG. 3, in schematic form.

This method, summarised in FIG. 6 is suitable if the differential delay, D, is large relative to the line-width of the laser. For example the cavity may have a length of 1 km and the linewidth could be 5 MHz.

The main spectrum of the monitor samples will be the DC tone of the data convolved with the CW laser line-width twice, convolved with the differential dither. The differential dither will be many MHz in amplitude, and so will push the laser-linewidth in and out of the monitor bandwidth. If the laser-linewidth is considered a wide-band noise carrier, this noise within the monitor bandwidth, will be modulated by the differential dither.

$$I(f)=\text{data}(f)+\cos(\text{dither}(t)-\text{dither}(t+D))\bullet\text{linewidth}\bullet\text{linewidth}$$

Where • means convolution operator

This can be detected by monitoring the variance vs time and correlating the variance to the zero crossings of the delta of the source dither pattern. The strength of this will be R×A (monitor doublesided bandwidth/(linewidth×root(2)). R can be calculated from the peak amount of correlation. With the example of sinusoidal phase dither, increasing D decreases the proportion of time that the "noise" is within the bandwidth of the monitor, and so narrows the correlation peak.

The signature of the MPI in the FM product spectrum will appear as a band of noise. The applied dither will effectively cause this noise band to sweep backwards and forwards along the spectrum. If the dither causes 750 MHz of frequency modulation, the noise band will appear only momentarily in the 1 MHz bandwidth window. The spectrum can be sampled at each zero crossing point of the amplitude modulation in the dither, to catch the signature as it sweeps through the window.

The spectrum shape will be so wide that there will be negligible slope to detect as it sweeps through the window, as shown in FIG. 9.

Other Conceivable Implementations

High frequency characteristics of the received data signal are a function of the MPI in the link. These signals could be analysed in a similar manner to that disclosed here.

The monitoring of MPI can take place while data traffic is present, or could be an out-of-service test that does not occur while the system is in service. This allows greater freedom in the choice of dither signals, as non-corruption of the data is not a constraint, but may be more complicated or less useful.

Rather than dithering a CW laser, the data traffic itself can create variations in the optical wavelength of the signal. For example the low frequency content of the data, say below 1 MHz, can cause thermal chirp of a laser that is being modulated. This chirp can be used as a stimulus for measuring the MPI. The low frequency content of the recovered data in the receiver could be used in this case to provide the pattern that is the basis of the analysis. Overhead bits in the data traffic could be adjusted to provide the pattern.

Cases with greater than two reflections can be analysed. If the reflections are substantially isolated into pairs then the linear additive approximation can be used, and this method applied to each pair. This method can be extended to handle coupled cavities.

Embodiments of the invention can provide an inexpensive addition to an optical transmission system that provides local measurement of the MPI upstream in the optical link. Most of the components may already be present for performing other functions eg the laser source used for data traffic can be used, together with a monitor tap, already provided in optical amplifiers for example.

It does not disturb the traffic, and can be continuously and/or remotely monitored.

Data recovered at the receiver may be used to determine the FM dither that was present in order to analyse the monitored signal, if patterns in the data are being used.

The results may be used to create alarms when outside of certain thresholds. The results, or alarms may be sent through the regular overhead system in a fiber transmission system. This information may be used to control other equipment.

All the techniques described are applicable in a bi-directional optical network. MPI in both directions can be measure in a bi-directional optical network.

Information about MPI measured at two or more sites/directions can be combined for averaging or for better determining the characteristics, or for determining the location of the source, eg if MPI with a given D is measured at one optical amplifier but not an another amplifier upstream, if can be deduced that the cavity lies between the two measurement points. Alternatively, or as well, the location of the MPI source can be established by reflection timing measurement.

The techniques disclosed are particularly applicable to a network containing one or more optical switches, or to networks that have a topology that is not a simple linear path, but has branches or loops, since MPI will change in operation.

---

APPENDIX

This is an examination of the general characteristics of the signals that will be present after a low bandwidth detector.

":=" is used as the assignment operator, i.e. "=".

Consider an optical transmission system where the optical signal transmitted equals s(t):
s(t) := lineam(t) · data(t) · $e^{(\omega t + \text{linepm}(t) + \text{chirp}(t))}$
With the real portion being the E field and the complex the H field, t being time,
data(t) being the NRZ data pattern,
lineam(t) being the am portion of the CW linewidth, and is real valued,
w being the carrier angular frequency times j,
linepm being the pm portion of the CW linewidth that is imaginary valued.
and chirp(t) being the chirp from the modulator that is imaginary valued.

-continued

APPENDIX
This is an examination of the general characteristics of the signals that will be present after a low bandwidth detector.
":=" is used as the assignment operator, i.e. "=".

The chirp is due to two portions: derivative of the data, datapm(t), and the SBS dither dither(t).
chirp(t) := j · (datapm(t) + dither(t))
After a Fabry-Perot Cavity of round trip delay D, and E field reflections R1, R2, and single-pass gain G*G, a single polarization signal s would become:
FP(t) := (1 − R1) · s(t) + R1 · R2 · $G^2$ · (1 − R1) · s(t + D) . . .
  + R1 · R2 · R1 · R2 · $G^4$ · (1 − R1) · s(t + 2 · D) + rest
For R1*G and R2*G small, the 1-R1 term can be dropped and only the first round trip considered
FP(t) := s(t) + R1 · R2 · $G^2$ · s(t + D)
Let G * G * R1 * R2, the strength of the cavity be represented as R
FP(t) := s(t) + R · s(t + D)
FP(t) := lineam(t) · data(t) · $e^{(\omega t + linepm(t) + chirp(t))}$ . . .
  + R · lineam(t + D) · data(t + D) · $e^{(\omega(t + D) + linepm(t + D))}$ . . .
  + chirp(t + D))
After a PIN detector, the current would be:
  I(t) := FP(t) · $\overline{FP(t)}$ $$I(t) := \begin{bmatrix} lineam(t) \cdot data(t) \cdot e^{(\omega t + linepm(t) + chirp(t))} \ldots \\ + R \cdot (lineam(t + D) \cdot data(t + D) \ldots \\ \cdot e^{(\omega(t+D)+linepm(t+D)+chirp(t+D))}) \end{bmatrix}$$

$\overline{\cdot (lineam(t) \cdot data(t) \cdot e^{(\omega t + linepm(t) + chirp(t))}) \ldots}$
$\overline{+ R \cdot (lineam(t + D) \cdot data(t) \ldots}$
$\overline{\cdot e^{(\omega(t + D) + linepm(t + D) + chirp(t + D))})}$
I(t) := lineam(t) · data(t) · $e^{(\omega t + linepm(t) + chirp(t))}$ . . .
  · (lineam(t) · data(t) · $e^{(\omega t + linepm(t) + chirp(t))}$) . . .
  + R · (lineam(t + D) · data(t + D) . . .
  · $e^{(\omega(t + D) + linepm(t + D) + chirp(t + D))}$) . . .
$\overline{\cdot (R \cdot (lineam(t + D) \cdot data(t + D) \ldots}$
$\overline{\cdot e^{(\omega(t + D) + linepm(t + D) + chirp(t + D))})) \ldots}$ $$+ \begin{bmatrix} lineam(t) \cdot data(t) \cdot e^{(\omega t + linepm(t) + chirp(t))} \ldots \\ \overline{\cdot (R \cdot (lineam(t + D) \cdot data(t + D) \ldots} \\ \overline{\cdot e^{(\omega(t+D)+linepm(t+D)+chirp(t+D))})) \ldots} \\ + R \cdot lineam(t + D) \cdot data(t + D) \ldots \\ \cdot e^{\omega(t+D)+linepm(t+D)+chirp(t+D)} \ldots \\ \overline{\cdot (lineam(t) \cdot data(t) \cdot e^{(\omega t + linepm(t) + chirp(t))})} \end{bmatrix}$$

I(t) := lineam$(t)^2$ · data$(t)^3$ + lineam$(t + D)^2$ · data$(t + D)^2$ · R · R . . .

$$+ \begin{pmatrix} lineam(t) \cdot lineam(t + D) \cdot data(t) \cdot data(t + D) \cdot R \ldots \\ \cdot e^{-\omega D + linepm(t) - linepm(t+D) + chirp(t)} \ldots \\ - chirp(t + D) \ldots \\ + lineam(t) \cdot lineam(t + D) \cdot data(t) \cdot data(t + D) \cdot R \ldots \\ \cdot e^{\omega D - linepm(t) + linepm(t+D) - chirp(t)} \\ + chirp(t + D) \end{pmatrix}$$

Case 1) Lineam is always very close to unity, D is very small relative to linepm.
I(t) := data$(t)^2$ + data$(t + D)^2$ · R · R + data(t) · data(t + D) . . .
  · R · $e^{(-\omega \cdot D + chirp(t) - chirp(t + D))}$ . . .
  + data(t) · data(t + D) · R · $e^{(\omega \cdot D + chirp(t + D) - chirp(t))}$
I(t) := data$(t)^2$ + data$(t + D)^2$ · R · R + data(t) · data(t + D) . . .
  · R · cos(chirp(t) − chirp(t + D) − (|ω| · D)) · 2
The chirp is due to two portions: derivative of the data, datapm(t), and the SBS dither (dither(t)
chirp(t) := j · (datapm(t) + dither(t))
I(t) := data$(t)^2$ + data$(t + D)^2$ · R · R . . .
  + data(t) · data(t + D) · R · cos(datapm(t) − datapm(t + D) . . .
  + dither(t) − dither(t + D) − (|ω| · D)) · 2
The chirp from the data modulation is nor present a fraction of the time, u>0.5. When it is present it is of such high frequency as to be out of the band of the DC monitor. The low frequency portion can be approximated by the equation below as the intervals of chirp repeat at such a high frequency that it is just a proportional diminishment of the low frequency signal, after a low pass

APPENDIX

This is an examination of the general characteristics of the signals that will be present after a low bandwidth detector.

":=" is used as the assignment operator, i.e. "=".

filtering.

$I(t) := \text{data}(t)^2 + \text{data}(t + D)^2 \cdot R \cdot R \ldots$
$\quad + \text{data}(t) \cdot \text{data}(t + D) \cdot R \cdot u \cdot \cos(\text{dither}(t) - \text{dither}(t + D)) \ldots$
$\quad - (|\omega| \cdot D)) \cdot 2$ If the data is random, then the spectrum of the data, data(t) is a sync function plus 50% of the power at DC. The low frequency content of the data is relatively small, so this can be approximated as 0.5. The residual correlation after delay D is relatively small compared to the DC, (a power of 0.5 per 100 ps) and so is ignored.

$I(t) := \text{data}(t)^2 + \text{data}(t + D)^2 \cdot R \cdot R \ldots$
$\quad + 0.5 \cdot R \cdot u \cdot \cos(\text{dither}(t) - \text{dither}(t + D) - (|\omega| \cdot D)) \cdot 2$ Thus for this case the signal detected will be the low frequency portion of the data, plus a term of strength R*u which is the phase modulation of the delta of the dither. For a sinusoidal dither the spectrum of this can be expressed as Bessel functions. For small deltas, the first order side-band will be strong. For larger deltas, D, the higher order side-bands will be sharing more of the energy. Classic FM analysis can be applied from here.

$I(t) := \text{lineam}(t)^2 \cdot \text{data}(t)^2 + \text{lineam}(t + D)^2 \cdot \text{data}(t + D)^2 \cdot R \cdot R \ldots$ $$+ \begin{pmatrix} \text{lineam}(t) \cdot \text{lineam}(t+D) \cdot \text{data}(t) \cdot \text{data}(t+D) \cdot R \cdot e^{-\omega D} \ldots \\ + \text{linepm}(t) - \text{linepm}(t+D) + \text{chirp}(t) - \text{chirp}(t+D) \\ + \text{lineam}(t) \cdot \text{lineam}(t+D) \cdot \text{data}(t) \cdot \text{data}(t+D) \cdot R \cdot e^{\omega \cdot D} \ldots \\ - \text{linepm}(t) + \text{linepm}(t+D) - \text{chirp}(t) + \text{chirp}(t+D) \end{pmatrix}$$

Case 2) Lineam is always very close to unity, D is very large relative to linepm.

$I(t) := \text{data}(t)^2 + \text{data}(t + D)^2 \cdot R \cdot R \ldots$ $$+ \begin{pmatrix} \text{data}(t) \cdot \text{data}(t+D) \cdot R \cdot e^{-\omega \cdot D + \text{linepm}(t)} \ldots \\ - \text{linepm}(t+D) + \text{chirp}(t) - \text{chirp}(t+D) \ldots \\ + \text{data}(t) \cdot \text{data}(t+D) \cdot R \cdot e^{\omega \cdot D - \text{linepm}(t)} \ldots \\ + \text{linepm}(t+D) - \text{chirp}(t) + \text{chirp}(t+D) \end{pmatrix}$$

linepm(t)–linepm(t+D) can be approximated by root (2) * linepm(t) as independent Following the arguments of case 1, this becomes:

$I(t) := \text{data}(t)^2 + \text{data}(t + D)^2 \cdot R \cdot R \ldots$
$\quad + \text{data}(t) \cdot \text{data}(t + D) \cdot R \cdot u$ $\qquad \cdot \cos[\text{dither}(t) - \text{dither}(t + D) - (|\omega| \cdot D) + \text{linepm}(t) \cdot \sqrt{2}\,] \cdot 2$ $I(t) := \text{data}(t)^2 + \text{data}(t + D)^2 \cdot R \cdot R \ldots$
$\quad + 0.5 \cdot R \cdot u \cdot \cos[\text{dither}(t) - \text{dither}(t + D) - (|\omega| \cdot D) \ldots$ $\qquad + \text{linepm}(t) \cdot \sqrt{2}\,] \cdot 2$ $I(t) := \text{data}(t)^2 + \text{data}(t + D)^2 \cdot R \cdot R \ldots$
$\quad + R \cdot u \cdot \cos[\text{dither}(t) - \text{dither}(t + D) - (|\omega| \cdot D) \ldots$ $\qquad + \text{linepm}(t) \cdot \sqrt{2}\,]$ The spectrum of this will be the DC tone of the data convolved with the CW laser line-width twice, convolved with the differential dither. The differential dither will be many MHz in amplitude, and so will push the laser-linewidth in and out of the monitor bandwidth. If the laser-linewidth is considered a wideband noise carrier, this noise within the monitor bandwidth, will be modulated by the differential dither.

$I(f) = \text{data}(f) + \cos(\text{dither}(t) - \text{dither}(t+D)) \cdot \text{linewidth} \cdot \text{linewidth}$ Where · means convolution operator This can be detected by monitoring the rms power and correlating the power variations to a template based upon the zero crossings of the delta of the source dither pattern. The approximate strength of this will be the R*u*(monitor doublesided bandwidth/linewidth*root(2)).

$I(t) := \text{lineam}(t)^2 \cdot \text{data}(t)^2 + \text{lineam}(t + D)^2 \cdot \text{data}(t + D)^2 \cdot R \cdot R \ldots$ -continued APPENDIX
This is an examination of the general characteristics of the signals that will be
present after a low bandwidth detector.
":=" is used as the assignment operator, i.e. "=".

$$+ \begin{pmatrix} \text{lineam}(t) \cdot \text{lineam}(t+D) \cdot \text{data}(t) \cdot \text{data}(t+D) \cdot R \cdot e^{-\omega D} \ldots \\ + \text{linepm}(t) - \text{linepm}(t+D) + \text{chirp}(t) - \text{chirp}(t+D) \ldots \\ + \text{lineam}(t) \cdot \text{lineam}(t+D) \cdot \text{data}(t) \cdot \text{data}(t+D) \cdot R \cdot e^{\omega \cdot D} \ldots \\ - \text{linepm}(t) + \text{linepm}(t+D) - \text{chirp}(t) + \text{chirp}(t+D) \end{pmatrix}$$

Case 3) Lineam is always very close to unity, D is moderate relative to linepm.
$I(t) := \text{data}(t)^2 + \text{data}(t+D)^2 \cdot R \cdot R \ldots$
  $+ \text{data}(t) \cdot \text{data}(t+D) \cdot R \cdot u \cdot \cos(\text{dither}(t) - \text{dither}(t+D)) \ldots$
  $- (|\omega| \cdot D) + \text{linepm}(t) - \text{linepm}(t+D)) \cdot 2$
If D is such that the differential dither and the differential linepm are of the
same order of magnitude, then correlating the variations in the slope of the
spectrum of the noise to the appropriate template can determine the amount
of F-P cavity present. For those D that substantially flatten the spectrum of
the differential linewidth other methods would be needed such as tracking the
central null.

I claim:

1. A method of operating an optical transmission system, comprising the steps of:
   transmitting light from an optical source;
   measuring the light transmitted in a downstream direction at a location downstream of the source using an element of the transmission system;
   deriving the amount of multi-path interference by analysing the measured light.

2. The method of claim 1 wherein the deriving step is carried out by analysing frequency modulation products in the measured light.

3. The method of claim 2 wherein the analysis of frequency modulation products comprises analysis of the frequency spectrum pattern by comparison with predetermined spectrum patterns.

4. The method of claim 2 wherein the analysis of frequency modulation products comprises analysis of the slope of the frequency spectrum by comparison with predetermined frequency spectrum slopes.

5. The method of claim 2 wherein the analysis of frequency modulation products comprises analysis of variance in the frequency modulation products, by comparison with predetermined variance amounts.

6. The method of claim 1 wherein the deriving step comprises the step of comparing a signal representing the measured light with templates generated for various possible multi-path delays, and the step deriving actual multi-path delays, and amounts of interference, from the comparison results.

7. The method of claim 1 further comprising the step of transmitting light with an applied frequency modulation in a frequency band below that of a data traffic transmission rate.

8. A method of operating an optical transmission system, comprising the step of transmitting light from an optical source; and
   measuring at a downstream location, the transmitted light travelling in the downstream direction,
   analysing the remotely measured light, to derive an amount of degradation due to multipath interference present in an optical path between the source and the remote measurement location, while the data traffic is present.

9. The method of claim 8 wherein the analysing step comprises the step of analysing frequency modulation products to derive an amount of multipath interference.

10. A method of operating an element in an optical transmission system, comprising the steps of:
    measuring the light transmitted in the system;
    deriving an amount of interference by analysing the measured light to distinguish interference caused by multipath effects; and
    using the derived value to control an element in the transmission system.

11. The method of claim 10 wherein the derived value is used to control an optical amplifier.

12. The method of claim 10 wherein the derived value is used to control an alarm issuing means.

13. A method of operating an optical transmission system comprising the steps of:
    transmitting light from an optical source, the transmitted light being frequency modulated;
    measuring the transmitted, modulated light,
    deriving the amount of multipath interference by analysing the modulation in the transmitted light.

14. The method of claim 13 further comprising the step of deriving a delay value for the interference.

15. The method of claim 13 further comprising the step of measuring the distance along the optical path to reflective features causing the multipath interference.

16. The method of claim 13 wherein the frequency modulation created by modulating the source with a predetermined dither pattern at frequencies below a data traffic transmission rate, and the method is carried out while data traffic is present.

17. A system for determining interference in an optical path of an optical transmission system comprising:
    means for measuring light in the optical path; and
    means for deriving an amount of interference caused by multi-path effects, from the light measured by the measuring means, wherein the measuring means is incorporated in an element of the transmission system.

18. The system of claim 17 comprising:
    means for applying a frequency modulation to the light in the optical path,
    wherein the deriving means is operable to derive the amount of interference using the frequency modulation in the transmitted light.

19. The system of claim 17 comprising a further means for measuring the light at a second location in the optical path;

and the means for deriving an amount of interference in the optical path is operable on the basis of the measurement of light at two or more locations in the optical path.

20. An optical transmission system comprising at least one element, and comprising an interference determining system as set out in claim 17 wherein one of the elements is controlled in dependence on the determined amount of interference.

21. A system for determining interference in an optical path of an optical transmission system comprising:

circuitry for measuring light in the optical path; and circuitry for deriving an amount of interference caused by multi-path effects, from the light measured by the measuring circuitry, wherein the measuring circuitry is incorporated in an element of the transmission system.

22. An optical amplifier comprising:

circuitry for measuring light in an optical path of the optical amplifier; and circuitry for deriving an amount of interference caused by multi-path effects, from the light measured by the measuring circuitry.

23. An optical receiver, for receiving digital data, comprising:

circuitry for measuring light in an optical path of the optical receiver; and circuitry for deriving an amount of interference caused by multi-path effects, from the light measured by the measuring circuitry.

* * * * *